(12) United States Patent
Feng

(10) Patent No.: US 11,163,403 B2
(45) Date of Patent: Nov. 2, 2021

(54) TOUCH POSITIONING METHOD AND APPARATUS, AND ELECTRONIC DEVICE

(71) Applicant: Chipone Technology (Beijing) Co., Ltd., Beijing (CN)

(72) Inventor: Pengfei Feng, Beijing (CN)

(73) Assignee: CHIPONE TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/628,016

(22) PCT Filed: Oct. 17, 2018

(86) PCT No.: PCT/CN2018/110574
§ 371 (c)(1),
(2) Date: Dec. 31, 2019

(87) PCT Pub. No.: WO2019/205511
PCT Pub. Date: Oct. 31, 2019

(65) Prior Publication Data
US 2020/0218425 A1 Jul. 9, 2020

(30) Foreign Application Priority Data
Apr. 26, 2018 (CN) .......................... 201810385770.0

(51) Int. Cl.
*G06F 3/041* (2006.01)
*G06F 3/0488* (2013.01)

(52) U.S. Cl.
CPC ........ *G06F 3/04186* (2019.05); *G06F 3/0488* (2013.01)

(58) Field of Classification Search
CPC .......................... G06F 3/04186; G06F 3/0488
See application file for complete search history.

(56) References Cited

U.S. PATENT DOCUMENTS

| | | | | |
|---|---|---|---|---|
| 8,902,186 | B2* | 12/2014 | Liu | G06F 3/041 |
| | | | | 345/173 |
| 9,081,450 | B1* | 7/2015 | Mohindra | G06F 3/045 |
| 9,507,454 | B1* | 11/2016 | Koblyuk | G06F 3/04883 |
| 10,775,937 | B2* | 9/2020 | Christiansson | G06F 3/04186 |
| 2011/0273404 | A1* | 11/2011 | Noma | G02F 1/13338 |
| | | | | 345/175 |

(Continued)

FOREIGN PATENT DOCUMENTS

| CN | 103135832 | 6/2013 |
|---|---|---|
| CN | 103164059 | 6/2013 |

(Continued)

*Primary Examiner* — Chun-Nan Lin
(74) *Attorney, Agent, or Firm* — Treasure IP Group, LLC

(57) ABSTRACT

The present application discloses a touch positioning method applied to an electronic device having a touch unit, the method comprises: acquiring a plurality of touch regions when touch action occurs on the touch unit, wherein each of the touch regions comprises a plurality of candidate points, and each of the candidate points has a sensing value; compensating the sensing values of the candidate points in an intersection region when the touch regions form the intersection region with other touch regions; calculating touch coordinates of the touch regions according to a position and a compensated sensing value of each of the candidate points in the touch regions.

6 Claims, 5 Drawing Sheets

(56) References Cited

U.S. PATENT DOCUMENTS

| | | | |
|---|---|---|---|
| 2014/0043263 A1* | 2/2014 | Park | G06F 3/0418 |
| | | | 345/173 |
| 2014/0085259 A1* | 3/2014 | Lee | G06F 3/04883 |
| | | | 345/174 |
| 2014/0145964 A1* | 5/2014 | Liu | G06F 3/041 |
| | | | 345/173 |
| 2015/0309660 A1* | 10/2015 | Lee | G06F 3/0418 |
| | | | 345/174 |
| 2017/0046006 A1* | 2/2017 | Kim | G02F 1/13338 |
| 2017/0090660 A1* | 3/2017 | Miyata | G06F 3/0346 |
| 2018/0121021 A1* | 5/2018 | Yu | G06F 3/04186 |
| 2018/0348949 A1* | 12/2018 | Kim | G06F 3/0443 |
| 2020/0264751 A1* | 8/2020 | Ha | G06F 3/16 |

FOREIGN PATENT DOCUMENTS

| | | |
|---|---|---|
| CN | 103870077 | 6/2014 |
| CN | 104238947 A | 12/2014 |
| CN | 208538143 A | 2/2019 |
| TW | 670699 B | 9/2019 |

\* cited by examiner

TOUCH POSITIONING METHOD AND APPARATUS, AND ELECTRONIC DEVICE

CROSS-REFERENCE TO RELATED APPLICATIONS

The present application claims the priority of the Chinese Patent Application No. 201810385770.0, filed on Apr. 26, 2018, and entitled "TOUCH POSITIONING METHOD AND APPARATUS, AND ELECTRONIC DEVICE", which is cited to the present application by referring to the entire specification, claims, drawings and abstract of the above-mentioned Chinese patent application.

BACKGROUND OF THE DISCLOSURE

Field of the Disclosure

The present disclosure relates to the field of electronic device, in particular, to a touch positioning method and apparatus, and electronic device.

Description of the Related Art

At present, the technology of directly operating electronic devices through the touch of a touch object such as a finger has been widely used in daily work and life. These electronic devices generally employ a touch apparatus to sense a touch action and generate a corresponding electrical signal for subsequent operation. The touch apparatus often appears in the form of a touch panel, a touch screen, or the like in actual production or use.

A general electronic device includes a display unit and a touch unit, wherein the display unit and the touch unit implement a display function and a touch function by means of time division multiplexing. The touch unit has a plurality of sensors for sensing a plurality of touch actions. The touch unit can be viewed as having a plurality of points arranged in a matrix form. When an object touches the touch unit, a number of points on the touch unit are touched, and the point touched is referred to herein as a "touch point." When there is a touch action on the touch unit, the sensors can be used to detect a sensing value (such as a capacitance value) corresponding to the touch point, and the sensing value of the touch point and corresponding position information are transmitted to a back-end circuit (the back-end circuit can be a processor or firmware). Traditionally, the back-end circuit will calculate a centroid coordinate based on the position of the touch point and its sensing value, thereby determining the touch coordinates of the position where the touch action occurs.

Currently, the process of positioning touch coordinates is: 1. detecting each point on the touch unit and obtaining a corresponding sensing value; 2. determining whether the sensing value of each point is greater than a predetermined threshold; 3. acquiring a plurality of peak values from the sensing values greater than the predetermined threshold, and finding a plurality of peak points; 4. acquiring a plurality of touch regions according to the peak points and size of the predetermined region; 5. calculating corresponding touch point coordinates of each touch region by a centroid algorithm according to the position of the candidate points of each touch region and the sensing value of each candidate point.

When the distance between two or more touch regions is small, the sensing values of some candidate points in the touch region are strengthened, thereby causing an error between the calculated touch point coordinates and the actual touch point coordinates.

SUMMARY OF THE DISCLOSURE

The purpose of the present disclosure is to provide a touch positioning method, apparatus and device, so as to improve the accuracy of touch positioning when a multi-touch distance is relatively close.

According to an aspect of the present disclosure, a touch positioning method applied to an electronic device having a touch unit is provided, the method comprises:

acquiring a plurality of touch regions when touch action occurs on the touch unit, wherein each of the touch regions comprises a plurality of candidate points, and each of the candidate points has a sensing value;

compensating the sensing values of the candidate points in an intersection region when the touch regions form the intersection region with other touch regions;

calculating touch coordinates of the touch regions according to a position and a compensated sensing value of each of the candidate points in the touch regions.

Preferably, compensating the sensing values of the candidate points in the intersection region when the touch regions form the intersection region with other touch regions comprises:

acquiring a compensation value of each of the candidate points in the intersecting region with respect to each of the other touch regions forming the intersection region;

acquiring the compensated sensing value of each of the candidate points in the intersection region according to the sensing value and the compensation value of each of the candidate points in the intersection region.

Preferably, the compensation value of each of the candidate points in the intersecting region with respect to each of the other touch regions forming the intersection region is acquired according to a relative distance between a center position of each of the other touch regions and each of the candidate points.

Preferably, each of points corresponds to a pixel or a plurality of pixels.

Preferably, acquiring the plurality of touch regions comprises:

detecting each point on the touch unit to acquire corresponding sensing value when the touch action occurs on the touch unit;

determining whether the sensing value of each point is greater than a predetermined threshold;

acquiring a plurality of peak values from the sensing values greater than the predetermined threshold, and finding a plurality of peak value points; and acquiring the plurality of touch regions according to the plurality of peak value points and a size of the predetermined region, each of the touch regions including the plurality of candidate points.

Preferably, the plurality of candidate points comprise peak value point and surrounding points adjacent to the peak value point.

According to a second aspect of the present disclosure, a touch positioning apparatus applied to an electronic device having a touch unit is provided, the touch positioning apparatus comprising:

a touch region module configured to acquire a plurality of touch regions when touch action occurs on the touch unit, wherein each of the touch regions comprises a plurality of candidate points, and each of the candidate points has a sensing value;

a compensation module configured to compensate the sensing values of the candidate points in an intersection region when the touch regions form the intersection region with other touch regions;

a touch coordinate module configured to calculate touch coordinates of the touch regions according to a position and a compensated sensing value of each of the candidate points in the touch regions.

Preferably, the compensation module includes:

an acquisition module configured to acquire a compensation value of each of the candidate points in the intersecting region with respect to each of the other touch regions forming the intersection region;

a compensation unit configured to acquire the compensated sensing value of each of the candidate points in the intersection region according to the sensing value and the compensation value of each of the candidate points in the intersection region.

Preferably, the compensation value of each of the candidate points in the intersecting region with respect to each of the other touch regions forming the intersection region is acquired according to a relative distance between a center position of each of the other touch regions and each of the candidate points.

Preferably, each of points corresponds to a pixel or a plurality of pixels.

Preferably, the touch region module comprises:

a detection unit configured to detect each point on the touch unit to acquire corresponding sensing value when the touch action occurs on the touch unit;

a determination unit configured to determine whether the sensing value of each point is greater than a predetermined threshold;

a peak value unit configured to acquire a plurality of peak values from the sensing values greater than the predetermined threshold, and find a plurality of peak value points; and a touch region unit configured to acquire the plurality of touch regions according to the plurality of peak value points and a size of the predetermined region, wherein each of the touch regions comprises the plurality of candidate points.

Preferably, the plurality of candidate points comprise a peak value point and surrounding points adjacent to the peak value point.

According to a third aspect of the present disclosure, an electronic device is provided, comprising above touch positioning apparatus.

The present disclosure provides a touch positioning method and apparatus, and electronic device, which determine whether the intersection region is formed by the plurality of touch regions when a plurality of points touching, and compensate sensing values of each of the candidate points in the intersection region when the coordinates of the touch points of each of the touch regions are calculated, so that the accuracy of the coordinates of the touch points of each of the touch regions is improved.

BRIEF DESCRIPTION OF THE DRAWINGS

The above and other objects, features and advantages of the present disclosure will become more apparent from the description below with reference to the accompanying drawings. In figures.

DESCRIPTION OF THE EMBODIMENTS

Figure 1:
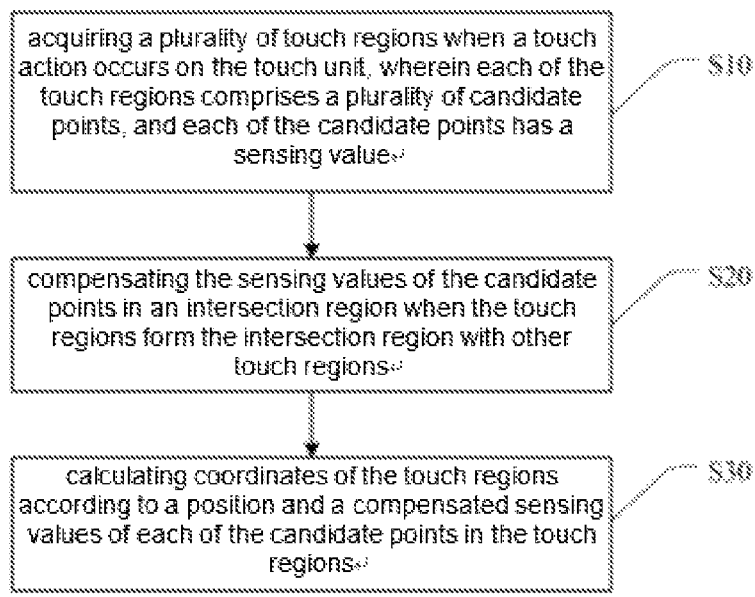
FIG. 1 is a flowchart of a touch positioning method according to an embodiment of the present disclosure.
Figure 2:
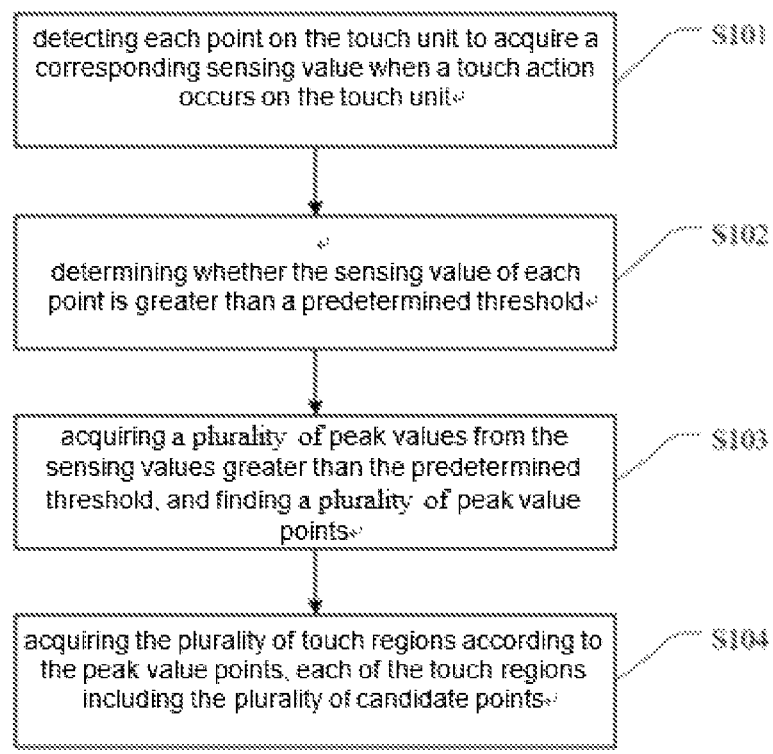
FIG. 2 is a flowchart of step S10 in a touch positioning method according to an embodiment of the present disclosure.
Figure 3:
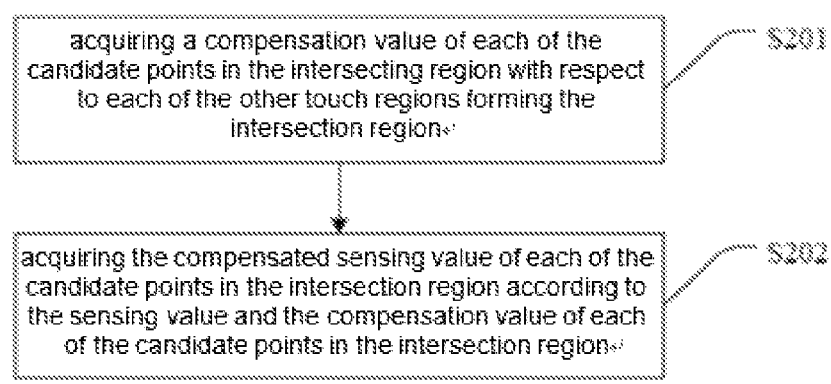
FIG. 3 is a flowchart of step S20 in a touch positioning method according to an embodiment of the present disclosure.

Various embodiments of the present disclosure will be described in more detail below with reference to the accompanying drawings. In the various figures, the same elements are denoted by the same or similar reference numerals. For the sake of clarity, the various parts in the figures are not drawn to scale.

The present disclosure can be embodied in various forms, some of which are described below. The word "comprising" as used throughout the specification and claims is an open term and should be interpreted as "including but not limited to".

Figure 4:
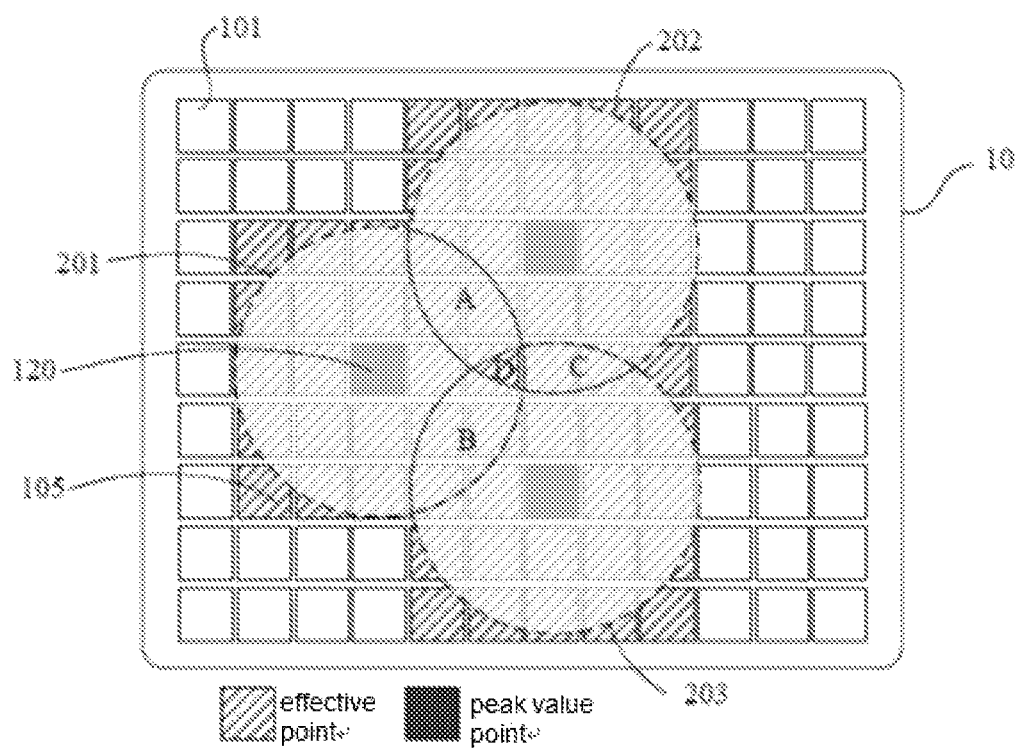
FIG. 4 is a view showing the occurrence of a touch action on a touch unit in the touch positioning method according to an embodiment of the present disclosure.

FIG. 1 is a flowchart of a touch positioning method according to an embodiment of the present disclosure. FIG. 4 is a view showing the occurrence of a touch action on a touch unit in the touch positioning method according to an embodiment of the present disclosure. As shown in FIGS. 1 and 4, the touch positioning method provided by the present disclosure is applicable to electronic device, and the touch positioning method includes the following steps.

In step S10, a plurality of touch regions are acquired when a touch action occurs on the touch unit, where each of the touch regions comprises a plurality of candidate points, and each of the candidate points has a sensing value.

In the present embodiment, a touch screen of the electronic device includes a display unit and a touch unit. Ideally, for a point on the touch unit, it corresponds to a sensing value of zero magnitude when it is not touched, and a sensing value of non-zero magnitude when it is touched. When an object (such as a finger) touches the touch unit, a region containing a plurality of touch points is referred to as a "touch region". In the method of the present disclosure, the "touch region" includes a plurality of candidate points. When a plurality of objects touching the touch unit, a plurality of "touch regions" are formed.

Specifically, the step S10 includes step S101 to step S104.

In the step S101, each point on the touch unit is detected to acquire corresponding sensing value when the touch action occurs on the touch unit.

In the present embodiment, as shown in FIG. 4, the touch unit 10 may be viewed as including a plurality of points 101, and each point 101 may correspond to one pixel or a plurality of pixels. Assuming that a plurality of objects (such as fingers or spikes, not shown) touch the touch unit 10, the plurality of touch regions (201-20n) are represented by a circle here, wherein n is a positive integer greater than 1. Each point 101 on the touch unit 10 is detected, and then the sensing values of the corresponding points 101 are obtained. The points associated with the touch regions are generally referred to as touch points, which having sensing values that are not zero.

In the step S102, it is determined whether the sensing value of each point is greater than a predetermined threshold, and the point at which the sensing value is greater than the predetermined threshold is herein an "effective point" 105. Due to the relationship of noise, some untouched points may have non-zero sensing values, but the sensing values of this part are usually quite small, which may be eliminated by this step.

In the step S103, a plurality of peak values are acquired from the sensing values greater than the predetermined threshold, and a plurality of peak points are found. That is, the effective points 105 acquired in the step S102 are further investigated. Among these effective points 105, the points at which the corresponding sensing values are peak values are referred to herein as peak points 120, as shown in FIG. 4.

In the present embodiment, in these effective points 105, when the sensing value of one effective point is greater than the sensing values of the effective points located at the upper, lower, left and right sides thereof, the sensing value of the effective point is the peak value, and its corresponding point is the peak point 120.

In the step S104, the plurality of touch regions are acquired according to a size of a predetermined region, with the peak point 120 as a center point. First, the size of the predetermined region of the touch region is configured, such as a region of 5×5 points (or other different sizes, such as the size of 3×3 points). Each of the touch regions 20n includes the peak point 120 located at the center point, and also includes points around the center point. The points included in this calculation region may be referred to as "candidate points", which are used to calculate touch coordinates corresponding to the touch region 20n.

As is well known, the touch unit 10 includes a plurality of sensing elements such as driving electrodes and sensing electrodes. Each of the sensing electrodes corresponds to one of the above points 101, and the driving electrodes are sequentially scanned. When one of the driving electrodes is scanned, a sensing value may be acquired according to the corresponding sensing electrode. For a mutual capacitive touch panel, the sensed value is acquired according to the sensing electrode instead of being acquired according to the driving electrode. Not every electrode corresponds to one point 101 of the touch unit 10, and the driving electrode does not directly generate a sensing value.

Wherein, one set of node capacitance matrices are acquired to obtain a set of Rawdata data (raw data) as reference data when touching is not performed, and one set of node capacitance matrices are acquired to obtain another Rawdata data (raw data) as scan data when touching is performed; then, a difference between the scan data and the reference data is calculated to obtain a difference data, which is the sensing value of each point when touching is performed.

In the step S20, the sensing values of the candidate points in intersection regions are compensated when the touch regions form the intersection regions with other touch regions.

In the present embodiment, taking three touch regions as an example, that is, the first touch region 201, the second touch region 202, and the third touch region 203, if no intersection regions are formed between the three touch regions, first touch coordinate is obtained according to position and sensing value of each of the effective points 105 in the first touch region 201, second touch coordinate is obtained according to position and sensing value of each of the effective points 105 in the second touch region 202, and third touch coordinate is obtained according to position and sensing value of each of the effective points 105 in the third touch region 203.

If the intersection regions are formed among the three touch regions, compensation is required for the sensing values of the candidate points in the intersection regions when the touch coordinates of each of the touch regions are calculated. As shown in FIG. 4, four intersection regions are formed among the first touch region 201, the second touch region 202 and the third touch region 203, i.e. A, B, C and D. The first touch region 201 includes intersection regions A, B, and D. When the first touch coordinate of the first touch region 201 is calculated, the sensing values of the candidate points in the intersection regions A, B, and D are compensated. The second touch region 202 includes intersection regions A, C, and D. When the second touch coordinate of the second touch region 202 is calculated, the sensing values of the candidate points in the intersection regions A, C, and D are compensated. The third touch region 203 includes intersection regions B, C, and D. When the third touch coordinate of the third touch region 203 is calculated, the sensing values of the candidate points in the intersection regions B, C, and D are compensated.

Specifically, the step S20 includes step S201 and step S202.

In the step S201, a compensation value of each of the candidate points in the intersecting region is acquired with respect to each of the other touch regions forming the intersection region.

In the present embodiment, the compensation value of each of the candidate points in the intersecting region with respect to each of the other touch regions forming the intersection region is acquired according to a relative distance d between a center position of each of the other touch regions and each of the candidate points. The compensation values of each of candidate points in the intersection regions are $K/d_1 + K/d_2 + \ldots + K/d_n$, where K is the compensation coefficient, and $d_1, d_2, \ldots d_n$ are the relative distances between the center position of each of the other touch regions that intersect in the touch regions and each of the candidate points in the intersection regions, respectively.

For example, in the touch region 201, the compensation value of each of the candidate points in the intersection region A is $K/d_1$, wherein $d_1$ is the relative distance between the peak point of the second touch region 202 and each of the candidate points in the intersection region A. The compensation value of each of the candidate points in the intersection region B is $K/d_1$, wherein $d_1$ is the relative distance between the peak point of the third touch region 203 and each of the candidate points in the intersection region A. The compensation value of each of the candidate points in the intersection region D is $K/d_1 + K/d_2$, wherein $d_1$ is the relative distance between the peak point of the second touch region 202 and each of the candidate points in the intersection region D, and $d_2$ is the relative distance between the peak point of the third touch region 203 and each of the candidate points in the intersection region D. The compensation values of the candidate points in other intersection regions are obtained according to above methods.

In the step S202, a compensated sensing value of each of the candidate points in the intersection region is acquired according to the sensing value and the compensation value of each of the candidate points in the intersection region.

In the present embodiment, taking the first touch region 201 as an example, the compensated sensing values in the intersection regions A, B, and D are differences between the sensing value and the compensation value of each of the candidate points.

In the step S30, touch coordinates of the touch regions are calculated according to the position and the compensated sensing value of each of the candidate points in the touch regions.

In the present embodiment, the first touch coordinate of the first touch region 201 is calculated according to the position and the compensated sensing value of each of the candidate points in the first touch region 201; the second touch coordinate of the second touch region 202 is calculated according to the position and the compensated sensing value of each of the candidate points in the second touch region 202; the third touch coordinate of the third touch region 203 is calculated according to the position and the compensated sensing value of each of the candidate points in the third touch region 203.

The present disclosure provides a touch positioning method, which determine whether the plurality of touch regions form an intersection region when a plurality of points are touched, and compensate sensing values of each of the candidate points in the intersection region when the coordinates of the touch points of each of the touch regions are calculated, so as to improve the accuracy of the coordinates of the touch points of each of the touch regions.

Figure 5:
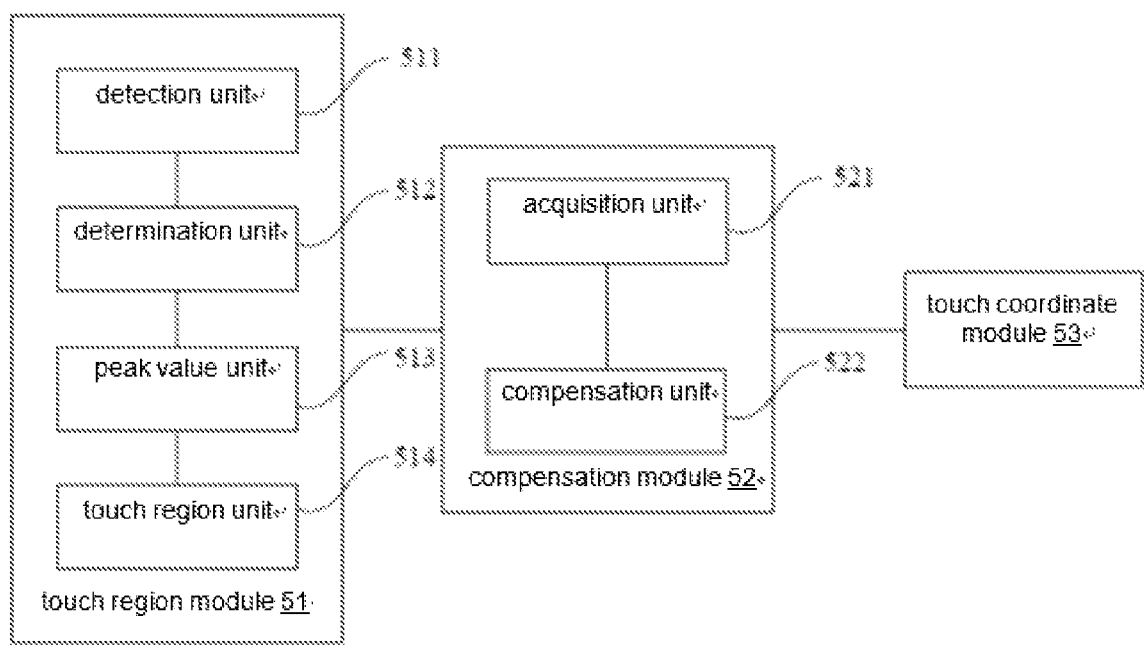
FIG. 5 is a structural view of a touch positioning apparatus according to an embodiment of the present disclosure.

FIG. 5 is a structural view of a touch positioning apparatus according to an embodiment of the present disclosure. As shown in FIG. 5, the touch positioning apparatus includes a touch region module 51, a compensation module 52 and a touch coordinate module 53.

Among them, the touch region module 51 is configured to acquire a plurality of touch regions when a touch action occurs on a touch unit, wherein each of the touch regions comprises a plurality of candidate points, and each of the candidate points has a sensing value.

In the present embodiment, a touch screen of the electronic device includes a display unit and a touch unit. Ideally, for a point on the touch unit, it corresponds to a sensing value of zero magnitude when it is not touched, and a sensing value of non-zero magnitude when it is touched. When an object touches the touch unit, a region containing a plurality of touch points is referred to as a "touch region". In the method of the present disclosure, the "touch region" includes a plurality of candidate points. When a plurality of objects touching the touch unit, a plurality of "touch regions" are formed.

Specifically, the touch region module 51 includes a detection unit 511, a determination unit 512, a peak value unit 513 and a touch region unit 514.

Among them, the detection unit 511 is configured to detect each point on the touch unit to acquire a corresponding sensing value when the touch action occurs on the touch unit.

In the present embodiment, as shown in FIG. 4, the touch unit 10 may be viewed as including a plurality of points 101, and each point 101 may correspond to one pixel or a plurality of pixels. Assuming that a plurality of objects (such as fingers or spikes, not shown) touch the touch unit 10, the plurality of touch regions (201-20n) are represented by a circle here, wherein n is a positive integer greater than 1. Each point 101 on the touch unit 10 is detected, and then the sensing values of the corresponding points 101 are obtained. The points associated with the touch regions are generally referred to as touch points, which having sensing values that are not zero.

The determination unit 512 is configured to determine whether the sensing value of each point is greater than a predetermined threshold. It is determined whether the sensing value of each point is greater than a predetermined threshold, and the point at which the sensing value is greater than the predetermined threshold is herein an "effective point" 105. Due to the relationship of noise, some untouched points may have non-zero sensing values, but the sensing values of this part are usually quite small, which may be eliminated by this step.

The peak value unit 513 is configured to acquire a plurality of peak values from the sensing values greater than the predetermined threshold, and find a plurality of peak value points. That is, the effective points 105 acquired in the step S102 are further investigated. Among these effective points 105, the points at which the corresponding sensing values are peak values are referred to herein as peak points 120, as shown in FIG. 4.

In the present embodiment, in these effective points 105, when the sensing value of one effective point is greater than the sensing values of the effective points located at the upper, lower, left and right sides thereof, the sensing value of the effective point is the peak value, and its corresponding point is the peak point 120.

The touch region unit 514 is configured to acquire the plurality of touch regions according to the plurality of peak value points and a size of the predetermined region, wherein each of the touch regions comprises a plurality of candidate points.

First, the size of the predetermined region of the touch region is configured, such as a region of 5×5 points (or other different sizes, such as the size of 3×3 points). Each of the touch regions 20n includes the peak point 120 located at the center point, and also includes points around the center point. The points included in this calculation region may be referred to as "candidate points", which are used to calculate touch coordinates corresponding to the touch region 20n.

As is well known, the touch unit 10 includes a plurality of sensing elements such as driving electrodes and sensing electrodes. Each of the sensing electrodes corresponds to one of the above points 101, and the driving electrodes are sequentially scanned. When one of the driving electrodes is scanned, a sensing value may be acquired according to the corresponding sensing electrode. For a mutual capacitive touch panel, the sensed value is acquired according to the sensing electrode instead of being acquired according to the driving electrode. Not every electrode corresponds to one point 101 of the touch unit 10, and the driving electrode does not directly generate a sensing value.

Wherein, one set of node capacitance matrices are acquired to obtain a set of Rawdata data (raw data) as reference data when touching is not performed, and one set of node capacitance matrices are acquired to obtain another Rawdata data (raw data) as scan data when touching is performed; then, a difference between the scan data and the reference data is calculated to obtain a difference data, which is the sensing value of each point when touching is performed.

The compensation module 52 is configured to compensate the sensing values of the candidate points in an intersection region when the touch regions form the intersection region with other touch regions.

In the present embodiment, taking three touch regions as an example, that is, the first touch region 201, the second touch region 202, and the third touch region 203, if no intersection regions are formed between the three touch regions, first touch coordinate is obtained according to position and sensing value of each of the effective points 105 in the first touch region 201, second touch coordinate is obtained according to position and sensing value of each of the effective points 105 in the second touch region 202, and third touch coordinate is obtained according to position and sensing value of each of the effective points 105 in the third touch region 203.

If the intersection regions are formed among the three touch regions, compensation is required for the sensing values of the candidate points in the intersection region when the touch coordinates of each of the touch regions are calculated. As shown in FIG. 4, four intersection regions are formed among the first touch region 201, the second touch region 202 and the third touch region 203, i.e. A, B, C and D. The first touch region 201 includes intersection regions A, B, and D. When the first touch coordinate of the first touch region 201 is calculated, the sensing values of the candidate points in the intersection regions A, B, and D are compensated. The second touch region 202 includes intersection regions A, C, and D. When the second touch coordinate of the second touch region 202 is calculated, the sensing values of the candidate points in the intersection regions A, C, and D are compensated. The third touch region 203 includes intersection regions B, C, and D. When the third touch coordinate of the third touch region 203 is calculated, the sensing values of the candidate points in the intersection regions B, C, and D are compensated.

Specifically, the compensation module 52 includes an acquisition unit 521 and a compensation unit 522.

Among them, the acquisition unit 521 is configured to acquire a compensation value of each of the candidate points in the intersecting region with respect to each of the other touch regions forming the intersection region.

In the present embodiment, the compensation value of each of the candidate points in the intersecting region with respect to each of the other touch regions forming the intersection region is acquired according to a relative distance d between a center position of each of the other touch regions and each of the candidate points. The compensation values of each of candidate points in the intersection regions are $K/d1+K/d2+ \ldots +K/dn$, where K is the compensation coefficient, and d1, d2, . . . dn are the relative distances between the center position of each of the other touch regions that intersect in the touch regions and each of the candidate points in the intersection regions, respectively.

For example, in the touch region 201, the compensation value of each of the candidate points in the intersection region A is $K/d1$, wherein d1 is the relative distance between the peak point of the second touch region 202 and each of the candidate points in the intersection region A, respectively. The compensation value of each of the candidate points in the intersection region B is $K/d1$, wherein d1 is the relative distance between the peak point of the third touch region 203 and each of the candidate points in the intersection region A. The compensation value of each of the candidate points in the intersection region D is $K/d1+K/d2$, wherein d1 is the relative distance between the peak point of the second touch region 202 and each of the candidate points in the intersection region D, and d2 is the relative distance between the peak point of the third touch region 203 and each of the candidate points in the intersection region D. The compensation values of the candidate points in other intersection regions are obtained according to above methods.

The compensation unit 522 is configured to acquire a compensated sensing value of each of the candidate points in the intersection region according to the sensing value and the compensation value of each of the candidate points in the intersection region.

In the present embodiment, taking the first touch region 201 as an example, the compensated sensing values in the intersection regions A, B, and D are differences between the sensing value and the compensation value of each of the candidate points.

The touch coordinate module 52 is configured to calculate touch coordinates of the touch regions according to the position and the compensated sensing value of each of the candidate points in the touch regions.

In the present embodiment, the first touch coordinate of the first touch region 201 is calculated according to the position and the compensated sensing value of each of the candidate points in the first touch region 201; the second touch coordinate of the second touch region 202 is calculated according to the position and the compensated sensing value of each of the candidate points in the second touch region 202; the third touch coordinate of the third touch region 203 is calculated according to the position and the compensated sensing value of each of the candidate points in the third touch region 203.

The present disclosure provides a touch positioning apparatus, which determine whether the plurality of touch regions form an intersection region when a plurality of points are touched, and compensate sensing values of each of the candidate points in the intersection region when the coordinates of the touch points of each of the touch regions are calculated, so as to improve the accuracy of the coordinates of the touch points of each of the touch regions.

The present disclosure further provides an electronic device comprising above touch positioning apparatus.

The embodiments in accordance with the present disclosure, as described above, are not described in detail, and are not intended to limit the present disclosure to be only the described particular embodiments. Obviously, many modifications and variations are possible in light of the above. These embodiments have been chosen and described in detail by the specification to explain the principles and embodiments of the present disclosure so that those skilled in the art can make good use of the present disclosure and the modified use based on the present disclosure. The protection scope of the present disclosure should be based on the scope defined by the claims of the present disclosure.

The invention claimed is:

1. A touch positioning method applied to an electronic device having a touch unit, wherein the method comprises:
acquiring a plurality of touch regions when a multi-touch action occurs on the touch unit, wherein each of the touch regions comprises a plurality of candidate points, and each of the candidate points has a sensing value;
compensating the sensing values of the plurality of candidate points of a first touch region of the plurality of touch regions to acquire compensated sensing values, by compensating the sensing values of the candidate points in an intersection region which is a part of the first touch region;
the intersection region is an overlap region of the first touch region and at least one second touch region of the plurality of touch regions, and the candidate points in the intersection region are also comprised by each second touch region of the plurality of touch regions;
calculating a touch coordinate of the first touch region of the plurality of touch regions according to a position of each candidate point in the first touch region, and the compensated sensing value of each candidate point in the first touch region,
wherein, for each candidate point in the intersection region, the corresponding compensated sensing value is acquired according to a relative distance between that candidate point and a center position of each second touch region.

2. The method according to claim 1, wherein compensating the sensing values of the plurality of candidate points of the first touch region by compensating the sensing values of the candidate point in the intersection region comprises:
for each candidate point in the intersection region, acquiring a compensation value with respect to each second touch region;
for each candidate point in the intersection region, acquiring the corresponding compensated sensing value according to the sensing value of that candidate point and the corresponding compensation value with respect to each second touch region,
wherein the touch coordinate of the first touch region is calculated according to the corresponding compensated sensing value of each candidate point in the intersection region.

3. The method according to claim 2, wherein,
for each candidate point in the intersection region, the corresponding compensation value with respect to one of the at least one second touch region is acquired according to K/d, wherein K represents a compensation parameter, and d represents the relative distance between that candidate point and the center position of the one of the at least second touch region, and
for each candidate point in the intersection region, the corresponding compensation value is acquired according to a sum of the corresponding compensation value with respect to the at least one second touch region.

4. The method according to claim 1, wherein each of points corresponds to a pixel or a plurality of pixels.

5. The method according to claim 1, wherein acquiring the plurality of touch regions comprises:
detecting each point on the touch unit to acquire corresponding sensing value when the multi-touch action occurs on the touch unit;
determining whether the sensing value of each point is greater than a predetermined threshold;
acquiring a plurality of peak values from the sensing values greater than the predetermined threshold, and finding a plurality of peak value points; and
acquiring the plurality of touch regions according to positions of the plurality of peak value points and a predetermined region size, each of the touch regions including the plurality of candidate points.

6. The method according to claim 5, wherein the plurality of candidate points in each of the touch regions comprise a corresponding one of the plurality of peak value points and surrounding points adjacent to the corresponding one of the plurality of the peak value points.

* * * * *